United States Patent
Paronen et al.

(10) Patent No.: US 9,714,873 B2
(45) Date of Patent: Jul. 25, 2017

(54) METHOD AND EQUIPMENT FOR MEASURING THE HEAT FLOW THROUGH CONSTRUCTIONS

(75) Inventors: Mikael Paronen, Espoo (FI); Kim Skön, Helsinki (FI)

(73) Assignee: Stiftelsen Arcada, Helsinki (FI)

( * ) Notice: Subject to any disclaimer, the term of this patent is extended or adjusted under 35 U.S.C. 154(b) by 360 days.

(21) Appl. No.: 14/394,108

(22) PCT Filed: Apr. 11, 2012

(86) PCT No.: PCT/FI2012/050357
§ 371 (c)(1),
(2), (4) Date: Oct. 13, 2014

(87) PCT Pub. No.: WO2013/153251
PCT Pub. Date: Oct. 17, 2013

(65) Prior Publication Data
US 2015/0085896 A1    Mar. 26, 2015

(51) Int. Cl.
G01K 17/00    (2006.01)
G01K 17/08    (2006.01)
G01K 17/20    (2006.01)

(52) U.S. Cl.
CPC .............. *G01K 17/08* (2013.01); *G01K 17/20* (2013.01)

(58) Field of Classification Search
USPC ...................... 374/29, 30, 112, 137, 166, 43
See application file for complete search history.

(56) References Cited

U.S. PATENT DOCUMENTS 2,878,669 A    3/1959    Knudson et al.
4,859,078 A    8/1989    Bowman et al.
(Continued)

FOREIGN PATENT DOCUMENTS

CH    442793 A    8/1967
CN    2476020 Y    2/2002
(Continued)

OTHER PUBLICATIONS

Suomen rakentamismääräyskokoelma C3, Rakennetun ympäriston osasto, Ympäristöministeriömääräykset.2010. Dec. 22, 2008.

*Primary Examiner* — Mirellys Jagan
(74) *Attorney, Agent, or Firm* — Seppo Laine Oy (57) ABSTRACT

Method and equipment for measuring the heat flow (J) through a construction (K) having a thickness (D), where a temperature difference ($\Delta T$) is formed transversely through the thickness of the construction. According to the invention, at least two temperature sensors (G1, G2) are placed against a first surface (S1) and at least one first temperature sensor (G1) is insulated thermally from the second temperature sensor (G2), so that the temperature (T1') sensed by the thermally insulated sensor (G1) is affected by the heat flow through the construction (K) more than the temperature (T1") detected by the second temperature sensor. The temperature difference (T1"–T1') between the second sensor (G2) and the first sensor (G1) is determined and the first sensor is supplied with energy by warming the first surface in a region surrounding the first sensor (G1), in order to reduce the temperature difference (T1"–T1') and based on the amount of energy ($E_Q$) supplied, the heat flow (J) through the structure is determined as a function of the temperature difference ($\Delta T$). The present invention makes it possible to easily determine the U-value of a construction.

17 Claims, 4 Drawing Sheets

(56) References Cited

U.S. PATENT DOCUMENTS

| | | | | |
|---|---|---|---|---|
| 7,597,668 B2 * | 10/2009 | Yarden | ............... | G01K 1/165 374/102 |
| 7,981,046 B2 * | 7/2011 | Yarden | ............... | A61B 5/01 374/100 |
| 2005/0259714 A1 * | 11/2005 | Lozinski | ............ | G01K 17/20 374/29 |
| 2011/0317737 A1 * | 12/2011 | Klewer | ............... | G01K 1/16 374/29 |
| 2014/0286373 A1 * | 9/2014 | Thresher | ............ | G01N 25/18 374/29 |

FOREIGN PATENT DOCUMENTS

| | | |
|---|---|---|
| CN | 1900705 A | 1/2007 |
| CN | 100523797 | 8/2009 |
| DE | 2724846 A1 | 12/1978 |
| DE | 102004018109 B3 | 6/2005 |
| EP | 1684065 | 7/2006 |
| FR | 2907215 A1 | 4/2008 |
| JP | 2007248220 A | 9/2007 |
| JP | 5332851 | 11/2013 |

\* cited by examiner

METHOD AND EQUIPMENT FOR MEASURING THE HEAT FLOW THROUGH CONSTRUCTIONS

FIELD OF INVENTION

The present invention relates to a method, according to the preamble of claim 1, of measuring the heat flow through three-dimensional objects, such as building constructions and similar structures.

According to a method such as this, at least two temperature sensors are placed against the surface of the construction to be investigated. A first temperature sensor is thermally insulated from a second temperature sensor in such a way that the temperature of the construction, which temperature is sensed by the thermally insulated first sensor, is affected by the heat flow to a larger extent than the temperature which is sensed by the second temperature sensor. The temperature difference between the first and the second sensor is determined. By thereafter supplying heat to the first temperature sensor, or by dissipating heat from it, it is possible to even out the temperature difference measured, and based on the amount of the supplied or the dissipated heat it is possible to determine the heat flow through the construction.

The present invention also relates to an equipment according to the preamble of claim 13.

BACKGROUND

Apparatuses for measuring heat flows through solid objects are previously known, for instance from DE 27 24 846, JP0533285 and CN 2476020.

JP0533285 refers to an equipment and a method for measuring the heat flow through materials. According to the known solution, a first sensor is arranged onto the material which is investigated and another onto a separate insulation layer; the actual measuring principle and related electronics are based on the Wheatstone bridge.

CN 2476020 describes an equipment for testing of the coefficient of heat transfer. The equipment comprises a box which can be placed onto the inside surface of a house wall, in order to measure the heat flow of the wall. The box is filled with air, and a thermosensor and a thermal resistance are placed inside the box. The power consumption is approximately 130-150 W. The box is designed for measuring walls having a U-value of 0.5 $W/m^2$ K. As it is a question of a box having large dimensions of almost half of one or one square meter, the equipment is not suitable for measuring heat flows, for instance, in a corner or over thermal bridges with a limited physical size in building structures. Moreover, it should be noted that the thermal resistance of the interface between air/wall surface is affected by the box itself, because the air in the box does not circulate in the same way as at a free wall surface.

SUMMARY OF INVENTION

The purpose of the present invention is to provide a new method and a new equipment which are suitable for measuring heat flows through solid, three-dimensional objects, such as building constructions, including walls, ceilings and floors and similar, typically plate-like structures, which are called, using a comprehensive concept, the "climate screen" of a building.

According to one aspect, the purpose is to provide a new technical solution which makes it possible to assess and measure also the heat flow through defined areas of three-dimensional objects.

The present invention is based on the principle that a measuring device is used, which has a frame with an inner surface, which is at least essentially planar and which can be placed against the surface of the structure, and an outer surface on which an insulation layer which covers the frame, is arranged. Furthermore, the equipment comprises a first temperature sensor on the inside of the frame and another temperature sensor which is arranged at a distance from the first temperature sensor and from the insulating layer, in such a way that the insulating layer does not cover the other sensor. Under the first insulating layer, essentially covered by it, the equipment has a heat transfer surface which, when using the equipment, is pressed against the surface of the structure. The first temperature sensor is set to sense the surface temperature of the construction, which sensor is more affected by the heat flow through the construction than the second temperature sensor.

In order to keep the temperature of the covered wall surface at the same level as the temperature of the surrounding wall surface, the heat transfer surface is supplied with energy, which thus is indirectly transferred to the first temperature sensor. At equilibrium, the energy fed per time unit is equal to the heat flow through the wall surface which is covered by the equipment. Based on this heat flow and the temperature of the warm and the cold side, it is possible to determine the heat leakage of the wall. More specifically, the method according to the present invention is characterized by what is stated in the characterizing part of claim 1.

The equipment, according to the present invention is, in turn, characterized by what is what is stated in the characterizing part of claim 13.

Considerable advantages can be achieved with the invention. As the examples below show, by using a simple measuring device, the construction of which is simple and the manufacturing technique of which is inexpensive, it is possible to achieve measurement results for the U-values, which already as uncorrected values easily match the theoretical values. If desired, it is naturally possible to use correction coefficients to further adapt the measurement values to correspond to the theoretical values.

The measurement is reasonably fast and the result is reproducible. The measuring instrument is not very bulky and can be used to measure defined parts of walls, ceilings and floors. Consequently, it is possible to carry out in-situ measurements in existing constructions without the need to open them. As the measurements can be repeated an arbitrary number of times, it is possible to determine, rapidly and without unnecessary delays, on a building site (for instance a renovation object), in which constructions and, in addition to that, where in these constructions, the main heat losses are located.

BRIEF DESCRIPTION OF THE DRAWINGS

In the following, the present invention will be examined more closely with the aid of the accompanying drawings.

EMBODIMENTS

The present measuring device and method are primarily intended to measure the thermal insulation of building parts. The thermal insulation capacity of a building part, or its thermal resistance is denoted by the magnitude R [m²K/W]. Vice versa, a so-called heat transfer coefficient or U-value [W/(m²K)] is used to describe the size of a heat loss. The U-value is the inverse of the thermal resistance, i.e. U=1/R. An example of this is that a wall, the U-value of which is 1 W/m²K, conducts or leaks 1 Watt through a surface of 1 m², if the temperature difference between the inner and the outer side is 1° K.

Generally, the present invention is applicable to different kinds of "constructions" or "structures", which here mean three-dimensional bodies which have a first surface with a first surface temperature, and a second surface which is located on the opposite side, or an essentially opposite side of the construction or structure, in relation to the first surface, and which has a second surface temperature. To allow usage of the measuring device and method, the three-dimensional body should be arranged in such a way that the first surface temperature is different from the second surface temperature, so that there is a temperature difference between the temperatures of the first and the second surface, or alternatively that there is a temperature gradient across the thickness of the construction, between the first and the second surface.

In the following, the present invention will be examined more closely with reference to the measurement of the heat flow through a structure (typically a wall, floor or ceiling), which is typically warm on the inside (warm side) and cold on the outside (cold side). However, it is obvious that the present invention is equally suitable for measuring constructions, the outside of which is warmer than the inside, for instance building constructions in countries with a hot climate, where the capacity of the construction to insulate against heat is a property of particular interest. In such cases, heat is discharged from the measurement surface by cooling, rather than added by heating.

Other examples of typical constructions or structures which can be evaluated with the present invention are outer and inner walls, outer and inner ceilings and floors. It is also possible to use the present invention, for instance, on the glass parts of windows and on doors.

In order to achieve reliable results, the equipment should be attached so tightly against the surface that essential heat losses are not generated between the heat transfer surface and the surface of the structure. In most cases, the measurement side (the warm side) of the structure, for instance the wall, ceiling, floor, window or door, is sufficiently smooth to make the measurement possible. However, if needed, it is possible to fit the base plate with a surface layer which provides a tight fitting against the surface. The surface layer can be comprised of, for instance, an elastic or flexible material layer which conducts heat. These are available, for instance, as polymeric material which comprises conductive particles or conductive polymers. If needed, it is possible to take into account the effect of the polymeric material on the measurement results by using a correction coefficient.

According to a preferred embodiment, the U-value is determined for three-dimensional materials, such as plate-like materials which can be used in walls, ceilings, floors, windows or doors.

Figure 1:
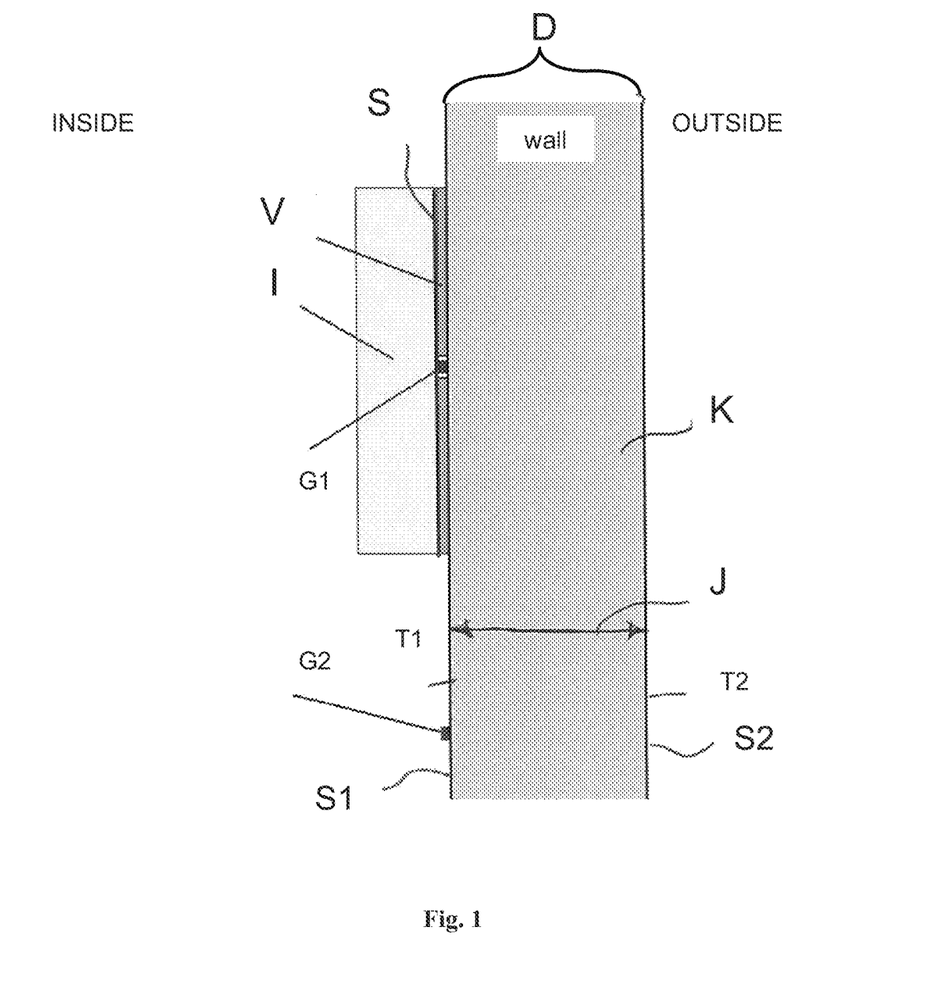
FIG. 1 shows in side view a basic diagram of the construction of the measuring device.

FIG. 1 shows a measuring device according to the present invention, placed against a wall, the U-value of which is to be determined.

With reference to the figure's reference symbols, it can therefore be concluded that the present invention can be used to measure the heat flow J through a construction K, having a thickness of D.

The construction, which can consist of, instead of the vertical wall in the figure, also a horizontal or inclined surface, for instance a ceiling or a floor in a building, or a separate, for instance, single board or a wall, ceiling or floor element, comprises a first surface S1 which is in contact with the air on the inside, and a second surface S2 which is in contact with the outside air.

There is a temperature difference between the first surface S1 and the second surface S2 when the temperature of the outside air (on the cold side) and the temperature of the inside (the warm side) differ from each other. Thus, temperature T1 at the first surface S1 differs from the temperature T2 at the second surface S2; in the present case T1>T2. Hence, a temperature difference arises across the construction.

It should be noted that in the present method, it is not necessary to measure the temperature T2, instead, the measurement process which is described below, is focused on the surface temperature T1 on the inside of the construction. However, when the U-value is calculated, data about the temperature of the warm side (not to be confused with the surface temperature of the inner wall) and of the outer air is also required. The latter is determined at a distance from the outer wall, preferably >1 cm, and the distance should not exceed 1 m.

Before the device is attached to the wall, the T1'=T1"=the temperature of the inner wall surface.

As also appears in the schematic picture shown in FIG. 1, in one embodiment, the measuring device comprises a frame S, a heating element V, two temperature sensors G1 and G2, insulation I and a battery and electronics (not shown). The temperature sensor G1, which is located under the insulation I, together with the heating element V, will be insulated from the air of the room, and becomes colder compared with the temperature sensor G2 (reference), which is located at the side of the instrument on the wall. T1 is the normal temperature of the wall surface.

According to a preferred embodiment, the frame S is comprised of a plate, the shortest dimension of which is at least 2 cm, in particular at least 3 cm, and which is transverse to the inside of the frame. The frame (S) is comprised of an essentially square or circular plate, which is at least mainly covered with an insulation layer. An appropriate size of the frame is approximately 10-1000 cm², preferably approximately 20-500 cm², typically approximately 30-250 cm². According to one embodiment, the size of the plate, which is brought into contact with the construction to be examined, is approximately 100 cm²±20%. In other words, it is a question of a relatively small construction, which makes it possible to measure smaller parts of the construction.

The first sensor G1 is arranged on the inside of the plate S and the second sensor G2 is attached to the plate by a bracket. Typically, the distance between the sensors is approximately 10-150 mm, preferably approximately 15-100 mm. The second sensor may be spring loaded, for it to be pressed against the surface at the same time the frame is pressed against it.

Preferably, the heat transfer surface V is comprised of thermal resistance coils, which cover a substantial part of the inside of the frame S.

According to a preferred embodiment, the instrument of the present invention comprises a temperature-controlled, insulated base plate with integrated heating coils, which is placed in direct physical contact with the wall surface. Between the plate and the wall surface there is essentially no layer of air. Unlike, for example, in the well-known box-design given in CN 2476020, in the present invention there is no need to consider the heat transfer resistance from the inside air to the wall surface, because the sensor measures the surface temperature of the surrounding wall and the base plate adjusts the underlying wall surface to the temperature of the surrounding wall.

The measurement is carried out so that
- at least two temperature sensors G1 and G2 are first attached against the first surface S1, and
- at least one of the temperature sensors, G1 is insulated thermally from a second temperature sensor G2, in such a way that the temperature T1', which is sensed by the thermally insulated sensor G1, is affected by the heat flow through the construction K more than the temperature T1", which is sensed by the second temperature sensor G2.

T" should ideally be totally independent of the heat flow through the construction K. G2 shall therefore only measure the surface temperature of the inner wall, which temperature should in a stationary state be constant because the heat flow from the room to the surface of the inner wall is equal to the heat flow from the inner wall surface to the outer wall surface.

After the device is attached to the wall surface the measurement starts. The temperature difference T1"–T1' between the sensor G2, and the thermally insulated sensor G1 is determined.

The temperature difference between the second sensor G2 and the thermally insulated sensor G1 is determined over a period of 1-1200 minutes.

The temperature T1' begins to decrease, if the temperature on the outer side is lower than on the inside, or rise, if the temperature on the outer side is higher than on the inside while T1" is more or less unchanged. From this it follows that the absolute value of the temperature difference T1"–T1' changes (i.e. becomes different from 0).

Following this, the heating element is switched on to heat the wall against which the temperature sensor G1 is attached. The heating element supplies heat until the same temperature is reached as the reference temperature, i.e. the moment when the temperature difference is as close as possible to zero. When a stable state is reached, it is assumed that all power supplied is led out through the wall. Thus it is possible to determine the U-value of the wall by considering the input power, the surface area (m²) which is covered by the instrument, i.e. the insulation, and the temperature difference between the hot side (inside air) and the cold side (outside air). The plate is electronically adjusted to the temperature of the console sensor.

With reference to the above, the method according to a preferred embodiment can be summarized as follows:

The device which is placed for instance on a wall, insulates the wall from the inside air. Therefore, the temperature begins to fall in the part of the wall which is covered by the device. To keep the temperature of the covered wall surface at the same level as the temperature of the surrounding wall surface, the base plate is heated with electrical energy. At equilibrium, the electrical energy fed in per time unit is equal to the heat flow through the wall surface covered by the device. Based on this heat flow and the temperatures of the warm and the cold side, it is possible to determine the heat leakage of the wall.

In one embodiment, which should only be seen as an example and in no way limitative of the present invention, an algorithm is used which means that when the difference between the temperatures T1"–T1' exceeds a predetermined first difference value $\Delta T_A$, the thermally insulated sensor G1 is supplied with energy E, in order to reduce the temperature difference so that it falls below a predetermined second difference value $\Delta T_B$. Starting from the power supplied, the heat flow J through the construction is determined as a function of the temperature difference $\Delta T$.

The temperature differences $\Delta T_A$ and $\Delta T_B$ can be chosen to be arbitrarily small to allow a supply of heat which is practically continuous. In one embodiment, $\Delta T_A$ is within a range of approximately 0.1-10 degrees and $\Delta T_B$ within a range of approximately 0.01-5 degrees.

The control may be a simple on-off control, PID control or some more advanced control algorithm. It is important that the two temperatures follow each other (follow-up control) as well as possible, because otherwise the measuring device will provide false measured values.

What is not shown in the picture is an LCD display that is integrated into the instrument. The display shows the temperature and the U-value when the device has reached thermal equilibrium. The electronic components are placed on the same circuit board as the heating coil, but on the other side.

According to a preferred embodiment, all the electronic components are surface mounted because it is not possible to drill holes through the board due to the heating coil. The advantages of such an assembly are that the instrument will be lighter, more affordable, simpler and more flexible due to smaller (mostly thinner) components.

Example

Tests have been performed on various materials with well-known thermal conductivity to analyze the performance and accuracy of the measuring instrument. The thermal conductivity of each material is commonly referred to as its λ value which is a material constant. To get the U-value for a particular piece of material, the λ value is divided by the thickness x of the material $$U = \frac{k}{x}$$

Numerous tests have been performed on an aquarium-like water tank. The aquarium is insulated on all sides except one side where the test material is attached. The aquarium has two water connections: one inlet and one outlet. The tests have been conducted with a constant inlet and outlet so that the water moves and is replaced. It can be assumed that the temperature is fairly identical and constant throughout the aquarium, including the surface of the glass against the test material, which is the most important.

The water temperature is recorded at the end of each measurement by means of a mercury thermometer in the water. A small deviation (maximum 0.5° C.) has still been found in the water and thus the tip of the thermometer has been held against the glass behind the test material and measuring instrument (the prototype).

The measuring instrument is monitored and achievement of thermal equilibrium (steady state) is determined. After that, the U-value is calculated from the difference between the steady state temperature and outside temperature, and the effect consumed at the temperature achieved at the steady state.

Figure 2:
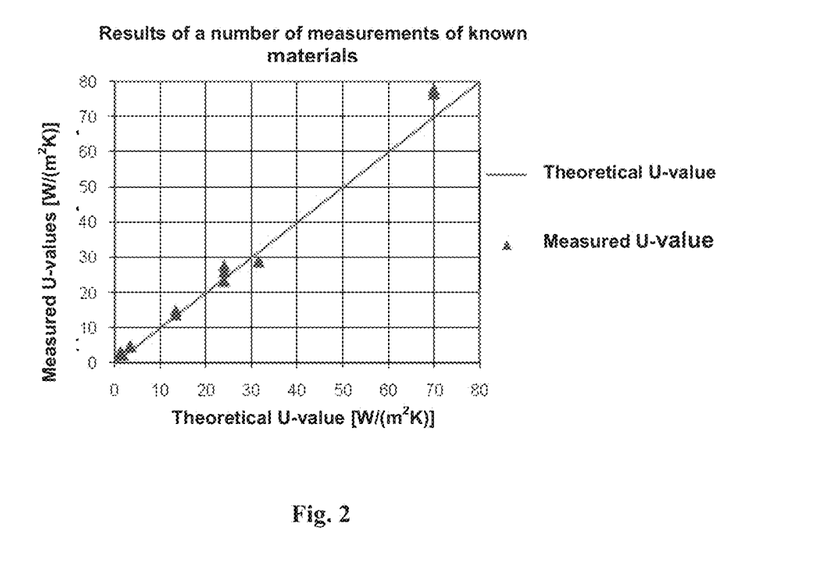
FIG. 2 shows the correlation between measured and theoretical U-values in a first series of measurements.
Figure 3:
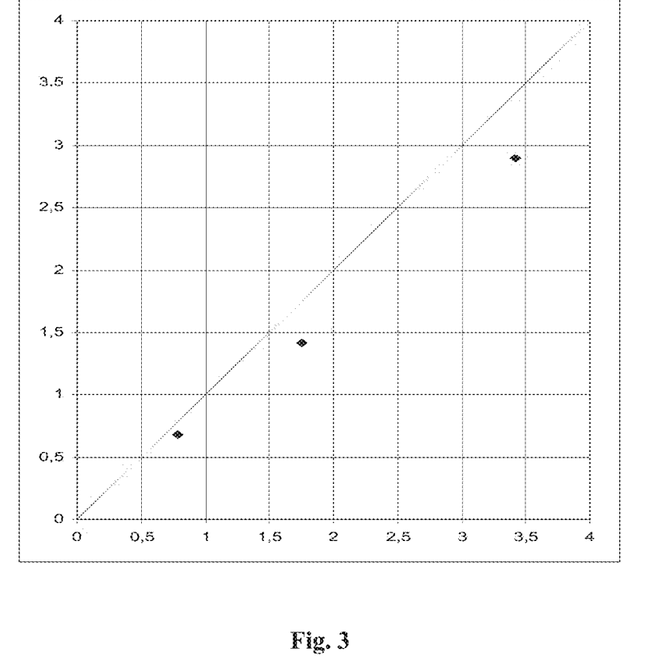
FIG. 3 shows the correlation between measured and theoretical U-values in a second series of measurements.

In order to evaluate the reliability of the measuring instrument, measurements have been carried out on materials having known U-values. FIGS. 2 and 3 show the measured U-value as a function of the known U-value (theoretical U-value). The pink line that lies as a diagonal in both graphs demonstrates the theoretical U-values for the various materials. The green triangles (FIG. 2) and the blue points (FIG. 3) in the graphs demonstrate the U-values measured with the measuring instruments.

Ideally, of course, the points would fall on the diagonal line, but already the results shown in FIGS. 2 and 3 show that the correlation is quite good.

Figure 4:
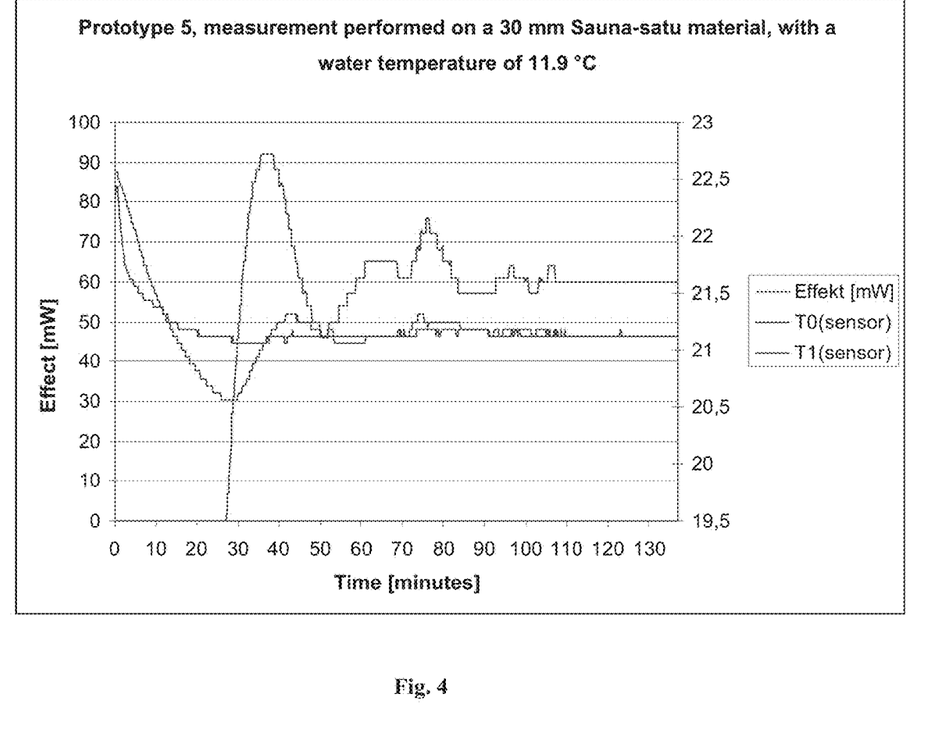
FIG. 4 shows a graph which illustrates the temperature of the two temperature sensors as a function of time. In the same figure the power consumption of the heat resistance as a function of time is also shown.

FIG. 4 shows a graph illustrating the power consumption of the instrument as a function of time, and the temperatures of the sensors as a function of time, during the entire period the instrument has been running. The red line in the graph shows the effect by which the instrument heats the heating coil. The green line is the temperature of the sensor G1, which is below the heating coil. The blue line represents the sensor G2 that measures the real temperature of the wall.

The figure clearly shows that the temperature sensor G1 which is located below the heating coil begins to cool down after a period of time, due to the influence of the heat flow generated through the wall. When the difference between the two sensors G1 and G2 is large enough, the instrument turns on the power and begins to heat the loop. After that, the instrument adjusts the power, in order to achieve the steady-state mode. The graph shows that after approximately 110 minutes, the steady state is reached. After the programme has calculated the result and shown it on the display, the measurement is terminated.

The invention claimed is:

1. A method of measuring the heat flow through a structure having a thickness, which construction comprises a first surface having a first surface temperature, and a second surface located on the opposite side of the construction relative to the first surface, wherein a temperature difference is formed transversely through the thickness of the construction, between the first and the second surface, wherein
at least two temperature sensors are connected to the first surface,
at least one first temperature sensor is insulated thermally from the second temperature sensor, so that the temperature, which is detected by the thermally insulated sensor, is affected by the heat flow through the construction more than the temperature, that is detected by the second temperature sensor, and
the temperature difference between the second sensor and the first sensor is determined,
wherein
in order to reduce the temperature difference,
energy is supplied to the first sensor by warming the first surface in a region surrounding the first sensor or
energy is discharged from the first sensor by cooling the first surface in a region surrounding the first sensor and based on the amount of energy that is supplied to or discharged from the first sensor, the heat flow through the construction, which heat flow depends on the temperature difference through the construction, is determined.

2. The method according to claim 1, wherein
a first sensor is attached against the first surface,
a second sensor is attached against the first surface at a distance from the first sensor,
the first sensor and an area of the first surface contiguous thereto are thermally insulated from the second sensor, in order to thermally insulate the first sensor from the second sensor,
the temperature that is sensed by the first and the second sensor, is determined,
the difference between the temperatures is determined, and
energy is supplied to the first sensor by warming the first surface in a region surrounding the first sensor, in order to reduce the temperature difference, and
based on the amount of energy supplied, the heat flow through the construction, which heat flow is due to the thermal difference, is determined.

3. The method according to claim 1, wherein the first and the second sensor are attached at a distance of at least 1 cm from each other.

4. The method according to claim 1, wherein the area adjacent to the first sensor is about 0.1-500 cm$^2$ and the shape of the area is quadratic or circular.

5. The method according to claim 1, wherein the temperature difference between the second sensor and the thermally insulated sensor is determined over a period of 1-1200 minutes.

6. The method according to claim 1, wherein the first surface temperature is larger than the second surface temperature and the energy is supplied in the form of electrical energy or thermal energy.

7. The method according to claim 1, wherein the energy is supplied through heating coils which are attached against the region of the first surface that is adjacent to the first sensor.

8. The method according to claim 1, wherein the temperature difference is determined continuously.

9. The method according to claim 1, wherein the heat flow through a wall, ceiling or floor of a building, or through one or more windows or one or more doors in a building, wherein the first surface comprises the inside of a wall, roof or floor or the inside of a window or of a door.

10. The method according to claim 1, wherein a U-value of a material is determined, which material can be used in wall constructions, by determining the temperature of warm side and of the outdoor air, the latter being determined at a distance of over 1 cm and at maximum 1 m from an outer wall.

11. The method according to claim 1, wherein
when the absolute value of the difference between the temperatures exceeds a predetermined first difference value, energy is supplied to the first sensor by warming the first surface in a region surrounding the first sensor, in order to reduce the temperature difference in such a way that it falls below a predetermined second difference value, and
based on the amount of energy supplied to the first sensor, the heat flow through the construction is determined, which is due to a thermal difference.

12. An equipment for measuring the heat flow through a construction, comprising a frame, with
an inside, which is planar and which is arranged to be attached against the surface of the construction,
an outside, which is located on the opposite side of the frame, relative to the inside
an insulating layer that is arranged on the outside of the frame and covering it at least in part,
a first temperature sensor that is arranged inside the frame is covered by the insulating layer,
a second temperature sensor that is arranged on the inside of a body at a distance from the first temperature sensor and from the insulating layer, and
a heat transfer surface that is arranged on the inside of the frame and is covered by the insulating layer, wherein the first temperature sensor is arranged to sense a surface temperature of the construction, which temperature is more influenced by the heat flow through the construction than the second temperature sensor.

13. The equipment according to claim 12, wherein the frame comprises a plate, having a minimum dimension transversely to the inner surface of the frame of at least 2 cm.

14. The equipment according to claim 12, wherein the frame comprises a quadratic or circular plate, at least most of which is covered by an insulating layer.

15. The equipment according to claim 12, wherein the first sensor is arranged on the inside of plate and the second sensor is attached by a bracket to the plate.

16. The equipment according to claim 12, wherein the heat transfer surface comprises thermal resistance coils covering a part of the inside of the frame.

17. The equipment according to claim 12, wherein the heat transfer surface surrounds the first sensor without touching it.

* * * * *